US007965404B2

(12) United States Patent
Sharma et al.

(10) Patent No.: US 7,965,404 B2
(45) Date of Patent: Jun. 21, 2011

(54) METHOD FOR REGENERATING MAILPIECE CONTENT MATERIAL IN A MAILPIECE CREATION SYSTEM

(75) Inventors: Vishnu Sharma, Bhubaneshwar (IN); Elaheh Zamanian, Trumbull, CT (US); Dale A. French, Branford, CT (US); Patrick Rolling, Southington, CT (US); Yichun Zhang, Webster, NY (US); Vinod B. Nethala, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1208 days.

(21) Appl. No.: 11/647,692

(22) Filed: Dec. 29, 2006

(65) Prior Publication Data

US 2008/0162163 A1 Jul. 3, 2008

(51) Int. Cl.
*G06F 3/12* (2006.01)
*G06K 9/00* (2006.01)

(52) U.S. Cl. ........................ 358/1.15; 382/101; 382/105

(58) Field of Classification Search ................. 358/1.15; 709/206; 382/101, 103; 370/229, 428
See application file for complete search history.

(56) References Cited

U.S. PATENT DOCUMENTS

| | | | | |
|---|---|---|---|---|
| 5,594,653 | A * | 1/1997 | Akiyama et al. | 700/117 |
| 6,721,456 | B1 * | 4/2004 | Aschenbrenner et al. | 382/233 |
| 2002/0184324 | A1 * | 12/2002 | Carlin et al. | 709/206 |
| 2003/0007180 | A1 * | 1/2003 | Urasawa et al. | 358/1.16 |

* cited by examiner

*Primary Examiner* — Benny Q Tieu
*Assistant Examiner* — Sunil Chacko
(74) *Attorney, Agent, or Firm* — Brian A. Collins; Charles R. Malandra, Jr.; Steven J. Shapiro

(57) ABSTRACT

A method is provided for printing and regenerating mailpiece content material in a mailpiece creation system having a controller for modulating the flow of data a printing device. The method comprising the steps of producing an electronic version of the mailpiece content material and generating print stream data indicative of the mailpiece content material. The print stream is then segmented into data sets/packets indicative of a self-contained pages of mailpiece content material. The data packets each include page-based data and an object-data dictionary associated with the page-based data. The data packets are then stored as electronic files in an electronic buffer and, from the electronic buffer, transmitted during a first data transmission to the integrated printer. After the pages are printed, the electronic files of self-contained pages are moved from the electronic buffer to a storage device. Should any pages be identified as having been unsuccessfully printed, the system controller issues a command signal to regenerate the unsuccessfully processed pages in a second data transmission. This final step can be performed automatically or manually.

7 Claims, 7 Drawing Sheets

METHOD FOR REGENERATING MAILPIECE CONTENT MATERIAL IN A MAILPIECE CREATION SYSTEM

RELATED APPLICATIONS

This patent application relates to commonly-owned, co-pending application Ser. No. 11/648,101 entitled "METHOD AND SYSTEM FOR CONTROLLING PRINT OPERATIONS IN A MAILPIECE CREATION SYSTEM".

TECHNICAL FIELD

The present invention relates to methods/systems for creating mailpieces, and, more particularly, to a method and system which integrates mailpiece content printing with mailpiece creation to prevent processing errors such as document jamming and/or print feed errors.

BACKGROUND OF THE INVENTION

A mail insertion system or a "mailpiece inserter" is commonly employed for producing mailpieces intended for mass mail communications. Such mailpiece inserters are typically used by organizations such as banks, insurance companies and utility companies for producing a large volume of specific mail communications where the contents of each mailpiece are directed to a particular addressee. Also, other organizations, such as direct mailers, use mailpiece inserters for producing mass mailings where the contents of each mailpiece are substantially identical with respect to each addressee.

In many respects, a typical inserter system resembles a manufacturing assembly line. Sheets and other raw materials (i.e., a web of paper stock, enclosures, and envelopes) enter the inserter system as inputs. Various modules or workstations in the inserter system work cooperatively to process the sheets until a finished mail piece is produced. Typically, inserter systems prepare mail pieces by arranging preprinted sheets of material into a collation, i.e., the content material of the mail piece, on a transport deck. The collation of preprinted sheets may continue to a chassis module where additional sheets or inserts may be added based upon predefined criteria, e.g., an insert being sent to addressees in a particular geographic region. Subsequently, the collation may be folded and placed into envelopes. Once filled, the envelopes are closed, sealed, weighed, and sorted. A postage meter may then be used to apply postage indicia based upon the weight and/or size of the mail piece.

The capacity, configuration and features of each inserter system depend upon the needs of each customer and/or installation. Until recently, mailpiece inserters were limited to two basic configurations, i.e., low-volume inserters capable of producing between about 5K-10K mailpieces monthly, and high-volume inserters capable of producing in excess of 100K mailpieces daily. To contrast the differences in greater detail, low volume inserters may occupy the space of a conventional office copier and generally will cost less than about twenty-thousand dollars ($20,000). High-volume inserters may extent over 100 feet in length and cost in excess of five million dollars ($5,000,000). Only recently have manufacturers introduced models having an intermediate capacity, i.e., producing between 50K-100K mailpieces monthly. Exemplary models fulfilling these specifications are the DI 900 and DI 950 Model inserters produced by Pitney Bowes Inc., located in Stamford, Conn., USA.

These inserters, whether in the low, intermediate or high-volume classes, typically require the use of "preprinted" sheets which are presented to the various downstream devices by a feed module for subsequent processing. While it has long been desirable to print mailpiece content material "on-demand", or "just in time", difficulties associated with matching the throughput, i.e., of the printer and downstream devices, have essentially prohibited printer integration. For example, when the print rate exceeds the processing rate of the downstream inserter devices, e.g., the speed that the machine inserts mailpiece content into an envelope, the sheets of content material either jam or are out-sorted. When the print rate lags behind the throughput rate of such devices, the productivity of the overall inserter degrades or diminishes. Even relatively small deviations in the rate of throughput can result in the aforementioned difficulties. Moreover, the print rate of standard printers, driven by commercially available application software, is essentially fixed. That is, there is no ability to vary the rate of printing for the purpose of synchronizing or matching the print rate to the rate of mailpiece creation.

A need therefore exists for a method and system for throttling the print rate of mailpiece content material to optimize throughput of a mailpiece inserter.

SUMMARY OF THE INVENTION

A method is provided for printing and regenerating mailpiece content material in a mailpiece creation system having a controller for modulating the flow of data a printing device. The method comprising the steps of producing an electronic version of the mailpiece content material and generating print stream data indicative of the mailpiece content material. The print stream is then segmented into data sets/packets indicative of a self-contained pages of mailpiece content material. The data packets each include page-based data and an object-data dictionary associated with the page-based data. The data packets are then stored as electronic files in an electronic buffer and, from the electronic buffer, transmitted during a first data transmission to the integrated printer. After the pages are printed, the electronic files of self-contained pages are moved from the electronic buffer to a storage device. Should any pages be identified as having been unsuccessfully printed, the system controller issues a command signal to regenerate the unsuccessfully processed pages in a second data transmission. This final step can be performed automatically or manually.

BEST MODE TO CARRY OUT THE INVENTION

The inventive method and systems for printing and producing mailpieces is described in the context of a mailpiece inserter system. Further, the invention is described in the context of DI 900 and DI 950 Model Mailpiece Inserters, i.e., mailpiece creation systems produced by Pitney Bowes Inc., located in Stamford, State of Connecticut, USA, though, the inventive subject matter may be employed in any mailpiece inserter and/or in print manager software algorithms used in the printing/creation of mailpieces such as PBFirst® ("PB-First" is a registered trademark of Pitney Bowes Inc), a software product for printing mailpieces processed by a mailpiece inserter system.

Figure 1:
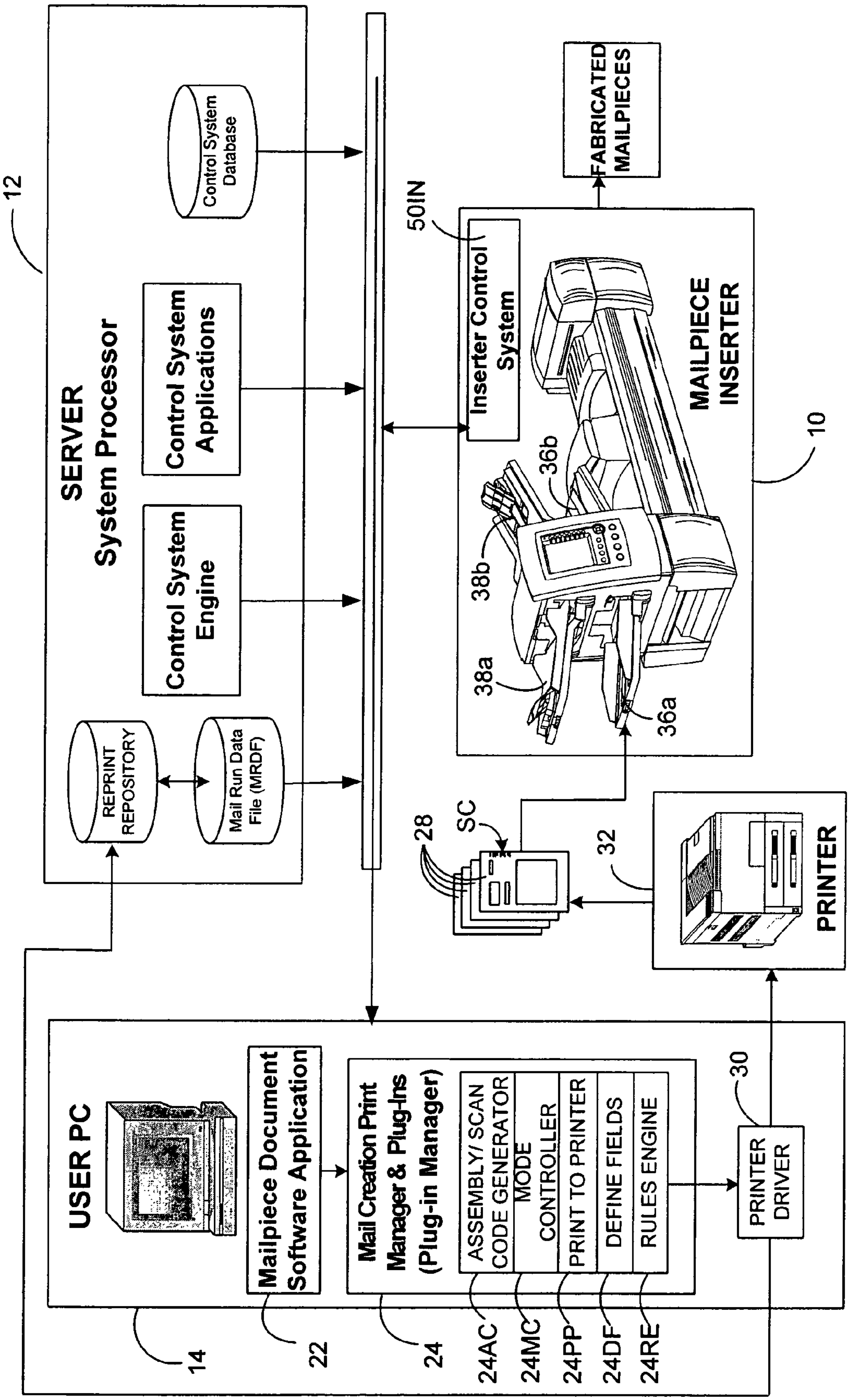
FIG. 1 schematically depicts the system architecture of a mailpiece insertion system according to the teachings of the present invention including a mailpiece inserter, a server/system processor and a User PC, which mailpiece insertion system is adapted to create, manipulate and print finished mailpieces.
Figure 1A:
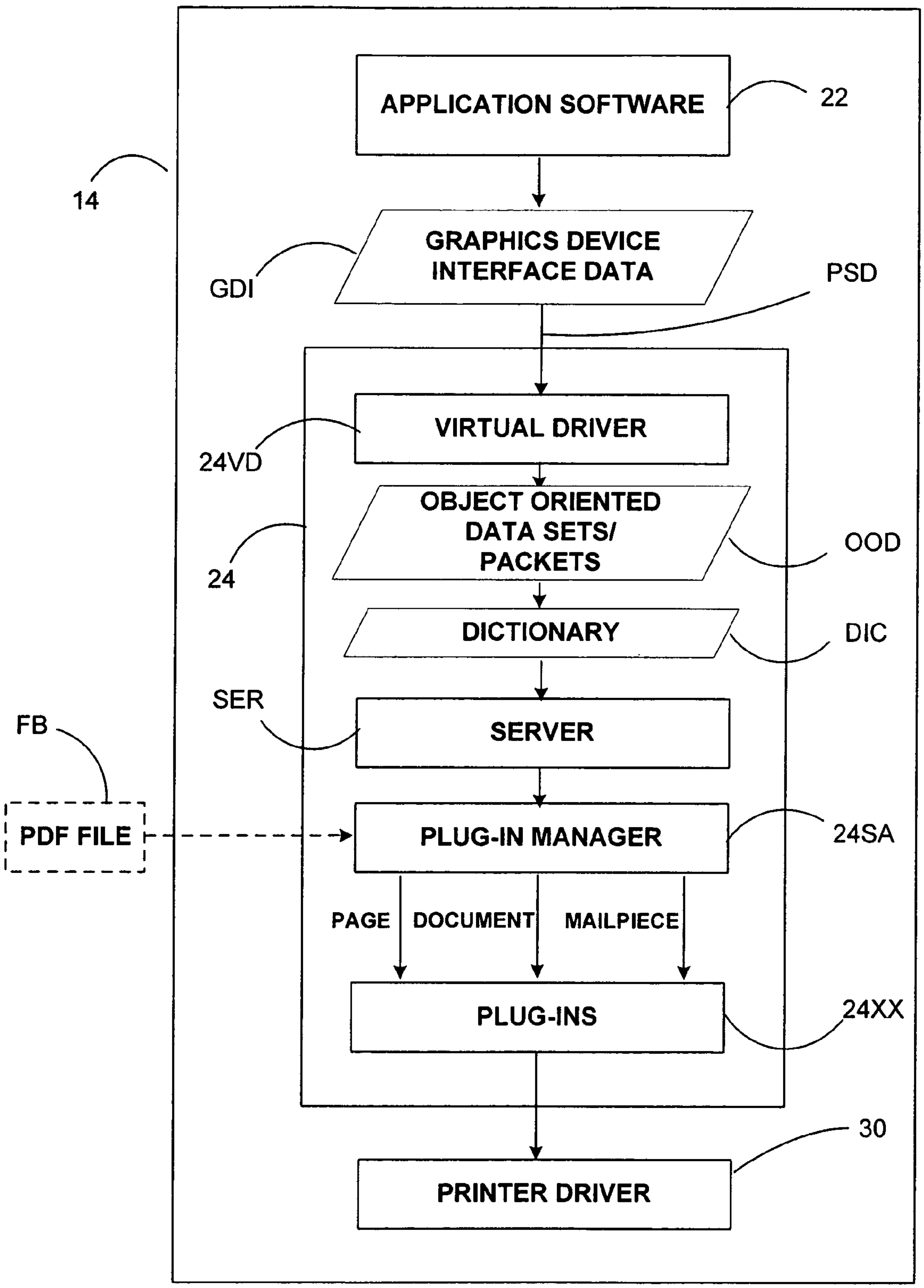
FIG. 1*a* depicts various elements of the User PC including a virtual driver for converting print stream data of an application into object oriented data for subsequent processing by various system plug-ins/modules.
Figure 1B:
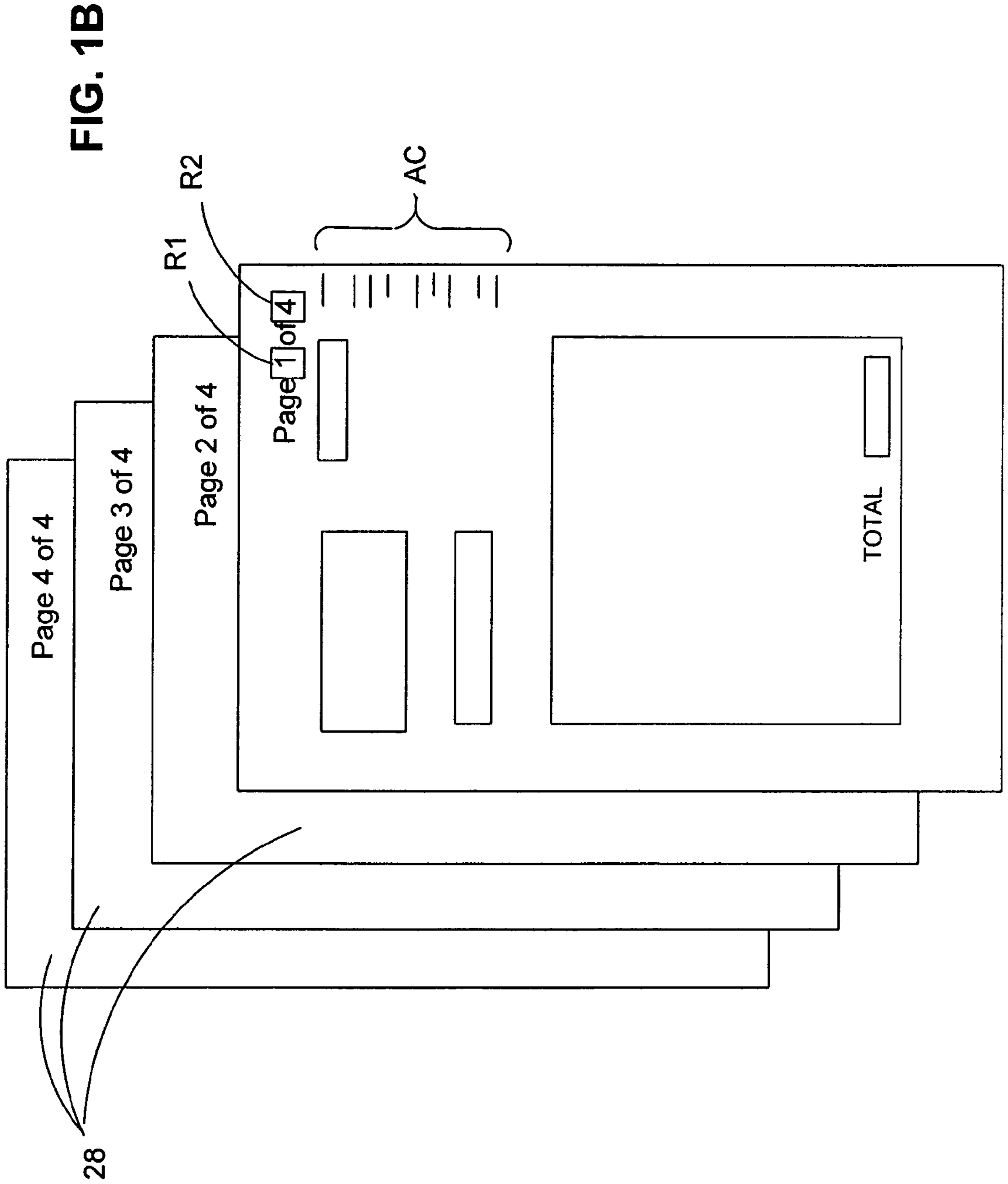
FIG. 1*b* depicts a stack of mailpiece content material having an assembly or scan code incorporated in the document for providing instructions in connection with the assembly of the mailpiece by the mailpiece inserter.

Before discussing the invention in greater detail, it will be useful to understand the system architecture of the inserter including the cooperation of the various components and system elements. In FIGS. 1, 1*a* and 1*b*, the principle elements of the Mailpiece Assembly System/Architecture 20 comprise a mailpiece creation system or mailpiece inserter 10, a system processor 12 (e.g., a server) and a client/user processor 14, (e.g., a user PC). Each of the system elements 10, 12, 14, is capable of accepting operator inputs, e.g., from an operator input device such as a keyboard or mouse, displaying outputs via a display monitor, and running program code on a system processor. Inasmuch as the elements 10, 12, 14 are network connected, inputs/outputs may be made/displayed from any of the system elements 10, 12, and 14. Notwithstanding the capabilities of each, the server/system processor 12 monitors and records information about mailpieces being processed on the mailpiece inserter 10. At the same time, the client/user processor 14 runs various application software 22 and system plug-ins 24 to create mailpiece content used by the mailpiece inserter 10 to produce finished mailpieces.

The system elements 10, 12, and 14 may function in a closed- or open-loop operating mode. The principle difference in the operating modes relates to whether the system elements communicate in real-time over a network line NL, or autonomously based upon predetermined algorithms. In a closed-loop operating mode the various system elements communicate to convey, monitor, and record information concerning the fabrication of each mailpiece. That is, the system elements 10, 12, and 14 share and store critical information which will be used to correctly assemble, detect errors/deficiencies in, and reprint, mailpieces. More specifically, the User PC runs prior to processing in the closed loop mode to produce the mailpiece documents and mail run data file while the mailpiece inserter 10 and system server 12 communicate in real-time. In an open loop operating mode, the server 12 is not required hence, the inserter 10 operates autonomously/independently and relies upon preprogrammed information internal to the mailpiece inserter 10 to provide the necessary mailpiece assembly instructions.

Whether operating in a closed- or open-loop configuration, the system architecture 20 employs an assembly instruction code AC (i.e., either a mailpiece or scan code) to communicate information concerning the fabrication of a mailpiece from the user processor 14 to the mailpiece inserter 10. In the context used herein, an "assembly or instruction code AC" (see FIG. 1*b*) is a mark or set of marks placed on the content sheets 28 of a mailpiece (typically in the right- or left-hand margin of the document) to control one or more operations/functions of the mailpiece inserter 10. One such control operation may include information concerning when a new document begins and/or ends in a stack of mailpiece content sheets, i.e., the initial and/or final page of a document. With this information the mailpiece inserter 10 can properly segregate one set of content sheets from those of another. The user processor 14 can upload the assembly instruction code AC from the inserter 10 (if the user processor 14 is connected via a network line NL), and incorporate the appropriate mark (e.g., a numeric identification number) into an object-oriented data file of the mailpiece content material. Alternatively, the user processor 14 can rely upon preprogrammed information of a Mail Creation Print Manager 24 to produce an assembly code AC in the converted image.

The significance of converting the electronic file of the mailpiece content material into to an object-oriented data file and the use of the Mail Creation Print Manager 24 will be discussed in an introductory section entitled "System Architecture & Print Stream Modification". This introductory section provides a fundamental understanding of the Sebring system architecture along with certain features which enable its efficient/unique operation. Further, the introduction provides a basic framework within which the invention(s) may operate, though invention(s) may be adapted to other system architectures and/or a various printer programs.

Thereafter, the discussion comprises a first section entitled "Printer Integration & Throttling" and a second section entitled "Regeneration of Mailpiece Content Material". The first section describes a method and system for selectively throttling and storing printed pages for "on-demand" printing and mail creation while the second section describes a method for automatically regenerating mailpiece content material which may have been out-sorted due to an error identified in the mailpiece content.

System Architecture & Print Stream Modification

In the Sebring mailpiece inserter, mailpiece content material is produced from an electronic application file indicative of a logical document. The method for producing the content material comprises the steps of: (i) producing an electronic file of content material from the specific software application (ii) generating print stream of data from the electronic file in a renderable format, (iii) converting the print stream into object-oriented data having defined objects, the objects defined or indexed by an object dictionary, (iv) parsing or segmenting the object-oriented data into a plurality of data sets, each data set comprising at least one data packet, (v) attaching the object dictionary to each data set, (vi) processing the data sets to create at least one logical document and (vii) printing the logical document for use in combination with a mailpiece inserter system.

Figure 2:
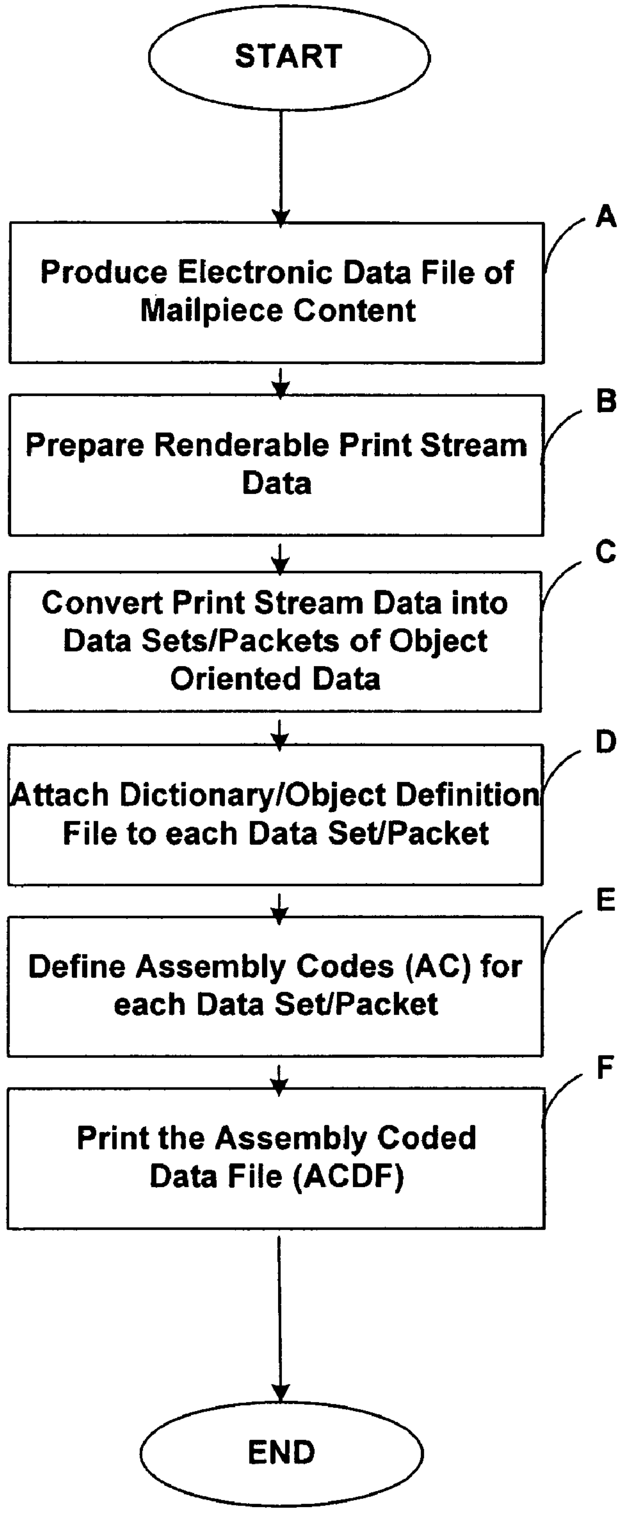
FIG. 2 is a block diagram of certain method steps for creating electronic mailpiece content material for subsequent printing and processing in the mailpiece inserter.

Referring to FIGS. 1-2, an application 22 such as a word processing, spreadsheet or graphics program is used in Step A to perform user space processes to generate an electronic data file of the mailpiece content. The application 22 is executed or run by an operating system for conducting and controlling various kernel space processes. An exemplary operating system which may be adapted to employ the teachings of the invention includes Windows® 2000 OS (Windows is a registered trademark of Microsoft Corporation having its principle base of operations in the State of Washington, USA). It should be appreciated, however, that the invention may be adapted to employ any operating system.

In step B, the operator inputs a print command which causes the application to generate a print stream of renderable data. That is, a Graphics Device Interface (GDI) applicable to a Windows-based Operating System (OS) is used by the application to appropriately render the text and graphics of the mailpiece content material. The GDI functions can be used to draw text, create paths, and generate bitmap & graphic images (e.g., lines, curves, closed figures, etc.). Furthermore, the application software can use the GDI functions to set operating modes and make current selections for an output device, e.g., a printer or video display. The operating modes may include: (a) the text and background colors, (b) the mixing mode which specifies how colors combine with colors already existing on the display surface, and (c) the mapping mode which dictates how coordinates used by the application software are mapped relative to the coordinate system of the output device. The current selections may identify which drawing objects (e.g., pens, brushes and fonts) are to be used. Inasmuch as the code/algorithms to generate such attributes are generally known to those skilled in the art, such program code is not discussed in greater detail herein. It is suffice to say that the attributes are defined using such devices as a GDI (or similar program code) for rendering the print stream data.

In step C, the Print Stream Data (PSD) rendered by the GDI (see FIG. 1*a*) is converted into object-oriented data OOD such as those objects/definitions/dictionaries employed in Portable Document Format (PDF) files. Inasmuch as a PDF conversion has become known in the industry as a universal term for an object-oriented data file, the terms PDF data and object-oriented data may be used interchangeably. However, it should be appreciated that such conversion is not limited to the specific objects/attributes typically assigned to/defined by PDF documents. For example, metacode data has some of the same features/attributes as PDF data, but in the broadest sense is, nonetheless, object-oriented data.

Returning to our discussion of Step C, the print stream data PSD is intercepted and manipulated by a Mail Creation Print Manager and associated Plug-in modules in preparation for printing by a conventional printer driver 30. More specifically, in FIG. 1*a* the program code of a Virtual Print Driver 24PD is adapted to convert the print stream data PSD (generated in response to an operator print command) into Object-Oriented Data OOD having defined objects/attributes. As mentioned in the preceding paragraph, the objects/attributes of the object oriented data OOD are essentially the same as those employed in PDF documents, though the objects selected and attributes assigned may have different meanings depending upon the selected format. Moreover, these objects are indexed in an object dictionary DIC (or header) for locating/identifying the data within the print stream.

The print stream data PSD is then parsed or segmented into a plurality of data sets which may each comprise one or more data packets. The number and size of the data sets are generally determined by the size of an individual page of the original document though the data packets may be smaller and contain multiple packets (e.g., two or more) for comprising a data set. In step D, the dictionary is attached/coupled to each data set, hence resulting in multiple data sets each having a shared object dictionary. The object dictionary may be common to many of the data sets, or may be individually modified or configured to index/identify the objects of a specific data set/packet. Hence, by attaching a configurable dictionary to each data set/packet the individual data sets/packets may be specifically, modified and manipulated.

By segmenting the print steam data into a plurality of data sets (each having an attached/coupled dictionary), throughput of the mailpiece inserter is significantly enhanced. That is, by segmenting the PSD into smaller units, the printer driver can begin incrementally printing of the segmented data. Accordingly, printing can begin before the entire electronic file and dictionary contents are completely processed (the dictionary is typically appended to the end of the electronic file). Furthermore. conversion of the print stream data into Object-Oriented Data OOD provides a unique opportunity to enable and perform manipulation of the print stream data PSD from the application software. For example, the OOD enables the user/system operator to define regions within the document, read from identified regions, extract information from select regions, perform operations on information contained in a specific region, insert new information (e.g., insert scan codes), re-order pages of the mailpiece contents, change its pagination, add and/or delete pages from the mailpiece contents, etc. Consequently, the object-oriented data provides significantly greater flexibility and capability to modify, manipulate, insert and/or extract information in connection with content material production/mailpiece fabrication than has been heretofore been directly available to the user/system operator. Furthermore, in the context of a mailpiece inserter, such capability was only available through the combined efforts of the OEM, skilled in the programming language used to operate the mailpiece inserter, and the customer having knowledge concerning the unique requirements and purpose of the mailpiece run data file.

A server application 24SA is then employed to reconstitute the object oriented data and dictionary OOD into individual pages, i.e., the predetermined smallest building block of the mail run data file. Next, the Plug-in Manager 24 PI divides and tracks the data as pages, documents, or mailpieces depending upon the optimization and timing requirements. Such PI managers are well-known in the art for optimizing and timing the throughput of data, hence no further discussion of the optimization algorithms are provided nor such details warranted.

Additionally, various modules or Plug-Ins 24XX are adapted to modify, manipulate and print the data pursuant to the requirements of a logical document. A logical document is any compilation of data arranged in accordance with the commands and controls implemented by the various plug-ins. Finally, the OOD is converted back into renderable data recognizable by the specific printer driver 30 which converts the OOD into the necessary printer control language PCL for being printed using conventional printer hardware.

In Step E, an assembly/scan code AC is defined indicative of the instructions for each of the mailpieces 28. To develop and execute the assembly code AC, the plug in manager 24 (see FIG. 1) includes a plurality of mailpiece plug-ins or modules 24 CG, 24MC, 24PP, 24DF, 24RE, etc. each having distinct and essentially autonomous functions. Furthermore, the Plug-in Manager 24 enables/disables these plug-ins and manages the workflow for running a particular print job. It should also be appreciated that defining an assembly code AC need not occur at this time, but may be developed at any time prior or subsequent to rendering the print stream data PSD. Table I below is a list and brief description of the various plug-ins managed by the Plug-In Manager 24.

TABLE I

| PLUG-IN | DESCRIPTION |
|---|---|
| ASSEMBLY/SCAN CODE GENERATOR | PRODUCES AN OMR, BARCODE, OR OTHER SYMBOLOGY TO PROVIDE INSTRUCTIONS RE: MAILPIECE ASSEMBLY FOR THE MAILPIECE INSERTER |
| PRINT/CONVERT TO OOD/PDF | USING A GRAPICS DEVICE INTERFACE (GDI) OR VIRTUAL PRINT DRIVER, THE APPLICATION SOFTWARE FILE IS CONVERTED TO AN OBJECT ORIENTED/PORTABLE DOCUMENT FORMAT (PDF) FILE. |
| PRINT TO PRINTER | SENDS AN OBJECT ORIENTED/PORTABLE DOCUMENT FORMAT (OOD/PDF INCLUDING SCAN CODES) TO PRINT DRIVER |
| PRINT PREVIEW | DISPLAYS THE CPDF IMAGE IN ACCORDANCE WITH THE FORMAT THAT THE DOCUMENT WILL BE PRINTED I.E., ON THE SELECTED PRINTER. |
| DOCUMENT BREAK | DETERMINES WHERE IN THE PRINT STREAM ONE DOCUMENT ENDS AND A NEW DOCUMENT BEGINS. RULES ARE USED TO DETERMINE WHEN A SET OF PAGES COMPRISE A LOGICAL DOCUMENT. |
| DUPLEX PRINTING | DETERMINES THE PRINTING SEQUENCE FOR PRINTING ON TWO SIDES OF THE MAILPIECE CONTENT MATERIAL. |
| FEATURES/DOCUMENT SELECTION | DETERMINES HOW MAILPIECE CONTENT MATERIAL WILL BE GROUPED OR SORTED. ALSO USED TO SELECT WHICH PLUG-INS WILL BE USED TO PROCESS THE PRINT STREAM. |
| DEFINE FIELDS | DEFINES THE SPATIAL LOCATION OF A FIELD (HIGHLIGHTED OR OTHERWISE DESIGNATED BY A USER) ON A DISPLAYED IMAGE OF A MAILPIECE DOCUMENT. SUCH FIELDS ARE THEN USED BY A RULES ENGINE TO ACCESS AND MANIPULATE THE CONTENTS OF THE OBJECT ORIENTED/PDF DATA/PAGE. |
| RULES EDITOR | PROVIDES THE USER WITH THE CAPABILITY TO MODIFY BASIC RULES AND EXPRESSIONS. TESTING AND CONFIRMATION OF THE RULES MAY ALSO BE PERFORMED USING THIS PLUG-IN. |
| JOB SELECTION | SELECTS WHICH JOB WILL BE PERFORMED BY WHICH INSERTER, I.E., IF THE SERVER CONTROLS MULTIPLE MAILPIECE INSERTERS. ALSO ALLOWS THE USER TO SELECT A PREVIOUSLY SAVED SET OF PRINT STREAM INTERCEPTION SETTINGS. |
| MACHINE SET-UP | DEFINES THE INSERTER SET-UP FOR FABRICATING THE MAILPIECE, E.G., THE MACHINE SET-UP FOR A MAILPIECE HAVING A C-SHAPE OR Z-SHAPE FOLD CONFIGURATION. |
| MAILPIECE TRACKING | MONITORS AND TRACKS THE STATUS OF MAILPIECES, I.E., WHETHER A MAILPIECE IS SUCCESSFULLY COMPLETED, FOR THE PURPOSE OF ESTABLISHING A REPRINT JOB FUNCTION. ALSO CREATES THE MAIL RUN DATA FILE AND REPRINT FILE, SETS/SAVES MAILPIECE TRACKING OPTIONS, DETERMINES WHEN A DOCUMENT IS TO BE DIVERTED, WHEN AN OPTIONAL INSERT SHOULD BE USED, AND WHEN AN AUDIT PIECE SHOULD BE GENERATED.. |
| ADDITIONAL RULES | ALLOS USERS TO DEVINE ARBITARY RULES THAT ARE PROCESSED FOR EACH PAGE, DOCUMENT AND MAILPIECE FOR THE ENTIRE INPUT FILE. |

To produce an assembly/scan code AC, the Mailpiece Print/Plug-in Manager 24 includes an Assembly/Scan Code Generator plug-in 24CG which converts various user/system operator commands into a symbolic representation (e.g., a numeric identifier, OMR marks or Barcode Symbology). These symbolic markings are recognizable by the mailpiece inserter 10 for performing various assembly instructions. More specifically, the Mailpiece Print/Plug-in Manager 24 processes input commands by calling upon the appropriate plug-in(s) capable of processing specific input commands. Examples of input commands may be represented by an assembly/scan code, or a portion thereof, include, (i) document breaks, i.e., where a document begins and ends using a Document Break plug-in, (ii) document printing, e.g., whether the document is printed on a single side or is double-sided by employing a Duplex Printing plug-in, (iii) document combinations, e.g., documents having identical addresses may be combined into a single envelope using a Document Selection plug-in, and (iv) document rules, e.g., documents having an invoice total exceeding a threshold value may receive an insert as determined by the mailpiece creation plug-in using the Rules Engine. The Mailpiece Print/Plug-in Manager 24 then produces/selects an assembly/scan code configuration which symbolically represents the various input commands. The assembly/scan codes AC may take a variety of forms including a series of long and short bars (OMR marks) disposed at a predetermined location or region of the PDF document. Typically such marks SC will appear in the right- or left-hand margin of a document (see FIG. 1*a*).

In step F, the object-oriented data file, including the scan code data (produced in by the Mail Creation Print Manager & Plug-ins 24 shown in FIG. 1), is configured to form electronic pages/documents/mailpieces and printed. In a closed-loop mode, the pages, mailpieces or documents may contain an identifier which can be read by the system processor 12 for the purpose of obtaining the requisite mailpiece assembly instructions. In an open-loop mode, the pages or mailpiece may contain the OMR or Barcode symbology in a margin of the document. To be recognized by a particular printer, it may be necessary to convert the electronic data back into a suitable Print Control Language (PCL) format. This reversion will typically be performed by a printer driver 30 (see FIG. 1) selected by the operating system based upon the printer 32 called upon to perform the job. Notwithstanding the various processes available to convert the file back into the appropriate PCL format, the processed data are printed using a Print-to Printer Plug-in 24PP. Furthermore, the printed mailpiece content material 28 may be collated to form a stack ready for processing by the mailpiece insertion system 10. While the system architecture 20 depicts a stand alone printer 32 for printing the mailpiece content material 28, the printer 32 may be integrated with the mailpiece insertion system 10. As such, no transfer of the mailpiece content material 28 would be required, i.e., from printer 32 to the mailpiece insertion system 10. That is, there would not longer be a requirement to load the mailpiece content material 28 into one or more input trays 36*a*, 36*b*. Such a system is described in the subsequent section of this application entitled "Printer Integration & Throttling"

For thoroughness of discussion, the Plug-in Manager 24PI may receive object oriented data from one of two paths. The path described in the preceding paragraphs relates to the "print interception path" (i.e., the steps A-E above). Therein, a print command is executed or input to the application 22, the print stream data is intercepted, segmented/manipulated into a plurality of object-oriented data sets, and provided to the plug-in manager for subsequent processing, i.e., processing by the various plug-ins. As mentioned before, this path enhances throughput and flexibility to manipulate data. Alternatively, object oriented data, e.g., a PDF file FB (see FIG. 1*a*), may be provided directly to the Plug-in Manager from a PDF file source. For example, a main frame processor may produce an entire PDF mail run data file directly to the Plug-in manager for processing by the various plug-ins. In this alternate path, no requirement for data conversion is required, i.e., conversion to object oriented data, and the data may be processed immediately. As such, the time required to perform an object oriented data conversion is abated, though the above-described flexibility to modify the data is lost due to the inability to compartmentalize the data into data sets/packets (each having its own configurable dictionary).

Printer Integration and Throttling

While mailpiece content material 28 can be printed, stacked and fed to the mailpiece creation system or mailpiece inserter 10IP via a plurality of input trays 36*a*, 36*b*, 38*a*, 38*b*, an equally viable system includes an integrated printer. When integrating a printer with a mailpiece creation system, several requirements/objectives should be met or obtained. First, to ensure maximum throughput, the system should minimize time gaps between a request for printing and the generation of printed content material. Second, inasmuch as the printer for such devices is commonly a costly, high-output device, it is desirable for the system to include a means for the printer to operate independently or in conjunction with the mailpiece inserter. Thirdly, to the extent that various application software may be employed to generate print jobs, it is desirable to affect integration of the printer without modifying or corrupting the print driver code. Finally, pages should be self-contained, i.e., containing all necessary data and information necessary to print an individual page of a mailpiece document. With respect to the latter, such requirement is necessary (as will be more clearly understood when discussing page regeneration) to reprint an individual page (e.g., missing, mis-fed, or damaged content material) automatically or "on-the-fly" without the requirement to reprint the document or entire print job. These requirements/objectives are discussed and met in the subsequent description.

Figure 3:
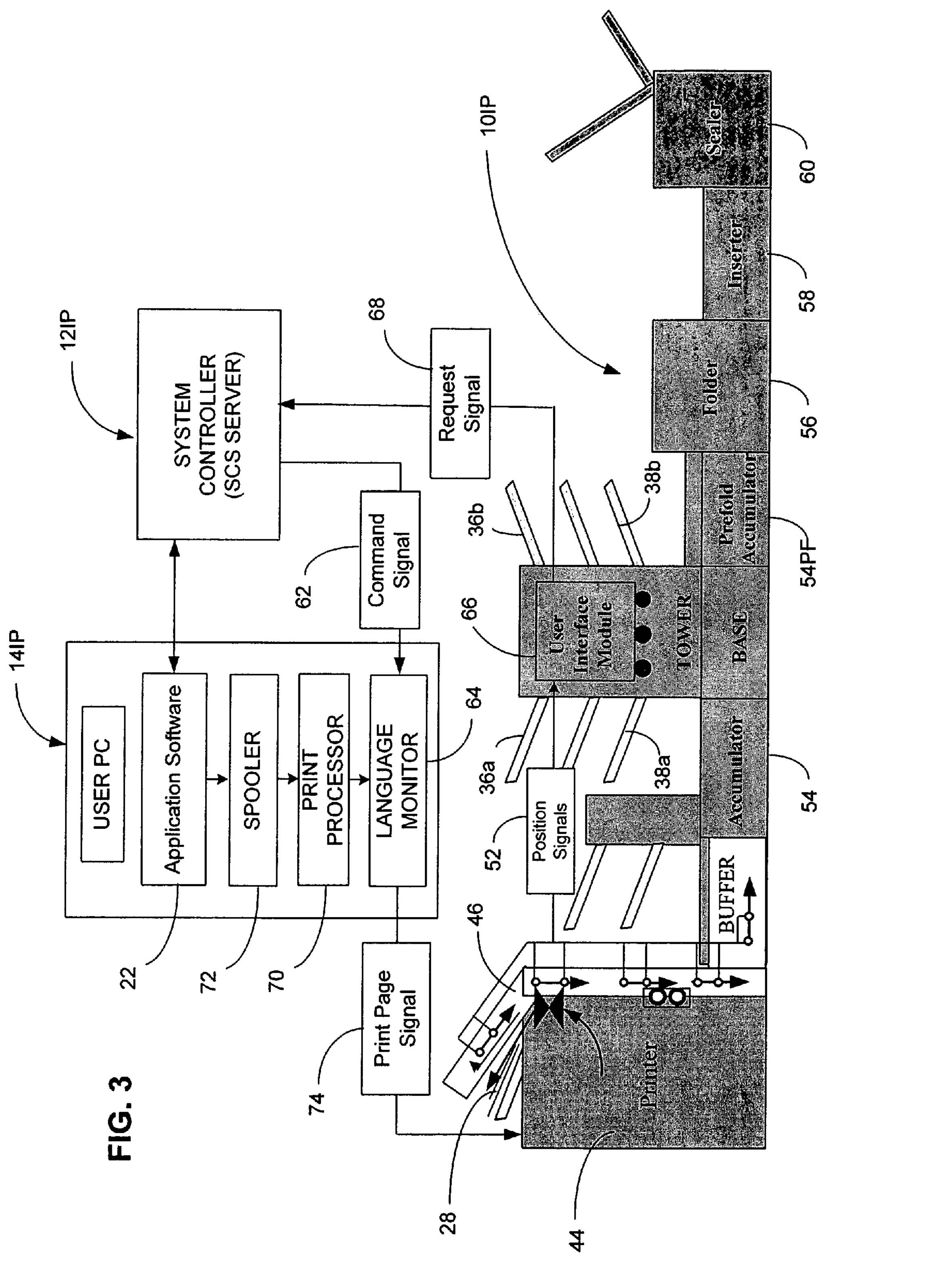
FIG. 3 is a schematic diagram of a mailpiece inserter or mailpiece creation system having a printer integrated upstream of the various mailpiece handling or processing modules, i.e., a mechanical printer buffer, folder, accumulator, inserter, and sealer.

In FIG. 3, a dedicated printer 44 is integrated with the mailpiece inserter 10IP and is disposed upstream of various inserter devices (also referred to as downstream devices relative to the dedicated printer 44) which handle and process the mailpiece content material 28. As mentioned in the preceding paragraph, the printer 44 may include a diverter mechanism 44D to send printed material, whether or not mailpiece content material, to an output tray. In the preferred embodiment, an HP 4350 and HP 4700 model printer system, manufactured by Hewlett Packard (HP), is integrated with the mailpiece inserter 10IP. The HP 4350 printer system has an output rate of approximately fifty-five (55) pages per minute (i.e., single color or black print) while the HP 4700 is capable of printing approximately thirty (30) pages per minute (colored print).

Figure 4:
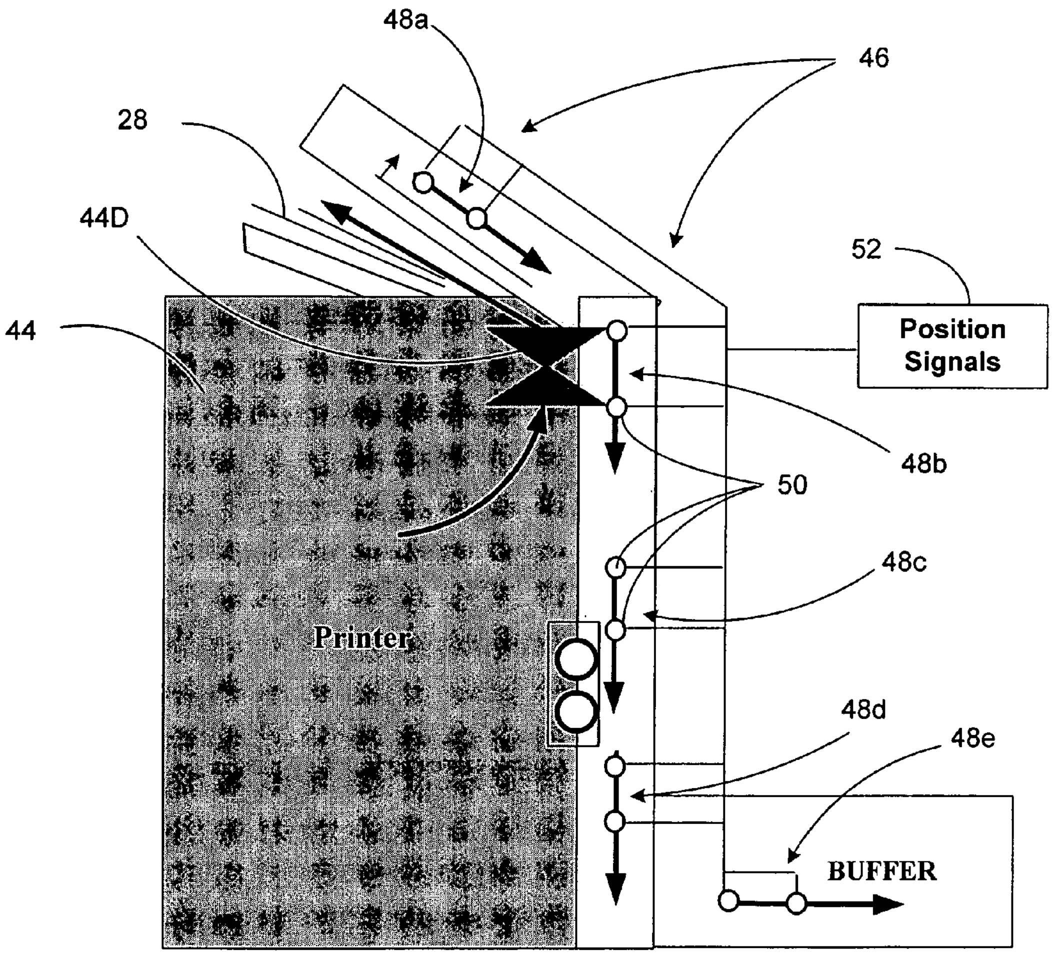
FIG. 4 is an enlarged schematic diagram of a mechanical printed-page buffer which senses the throughput status of mailpiece content material prior to downstream processing by the inserter.

The inventive system for processing mailpiece content material, or otherwise referred to as a print integration system, includes an inserter control system or controller 12IP operative to monitor the throughput rate of the at least one downstream devices. In FIGS. 3 and 4, a mechanical printed page buffer or printer butter 46 is disposed downstream of the printer 44 and functions to monitor/track the throughput of printed pages being processed by the inserter 10IP. More specifically, the printer buffer 46 receives printed content material from the printer 44 and includes a plurality of sequential page stations 48*a*, 48*b*, 48*c*, 48*d*, 48*e* disposed along a conveyor system. Sensing devices 50 are located at or along each of the page stations 48*a*, 48*b*, 48*c*, 48*d*, 48*e* and are operative to monitor the rate that printed pages enter or leave buffer 46. Furthermore, the sensing devices issue position signals 52 to the system controller 12IP such that the inserter may determine whether a page is positioned at a particular one of the page stations 48*a*, 48*b*, 48*c*, 48*d*, 48*e*. In the described embodiment, the sensing devices 50 are photocells, though any position sensor may be employed.

The rate of change of the position signals 52 issued by the page buffer 46 may be used by the controller 12IP to determine the throughput rate that content material being processed. Generally, it is the objective of the system controller 12IP to drive the printer 44 to generate material content at a rate consistent or commensurate with the rate of processing by other downstream devices of the mailpiece creation system 10. While, in the described embodiment, the downstream device is a page buffer 46 for issuing position signals 52 to generate a rate of throughput, it should be appreciated that any downstream device may be adapted to issue a throughput signal indicative of the rate that content material or mailpieces are processed by the inserter 10IP. In FIG. 3, such downstream devices may additionally, or alternatively, include an accumulator 54, a pre-fold accumulator 54PF, a folder 56, envelop inserter 58, and/or a sealer 60.

The system controller 12IP monitors the throughput rate data and issues command signals 62 indicative of the number of pages to be printed by the integrated printer 44. More specifically, the command signals 62 are indicative of a specific page number to begin printing along with the number of pages to follow. For example, the controller 12IP may issue command signals requesting the printer to generate page number thirty (Page #30) plus five (5) additional pages of data. Before this request is issued to the printer (in the more conventional sense), the controller 12IP issues the command through a page-based language monitor 64. In the preferred embodiment, the system controller 12IP generally issues a command signal to print between three (3) to seven (7) pages with each request, though several command signals may be generated within a very short period of time.

In the described embodiment, the mailpiece inserter includes a User Interface Module (UIM) 66 interposing the mechanical page buffer 46 and the system controller 12IP. The UIM 66 is responsive to the position signals 52 of the mechanical page buffer 46 for determining when additional content material 28 can be accepted by the page buffer 46. Furthermore, the UIM 66 is operative to issue a request signal 68 to the system controller 12IP which request signal 68 is indicative of the number of mailpiece content pages 28 to the printed. Hence, conversion of the position signals 52 to a command signal 62 may be performed by either the system controller 12IP or the UIM 66, depending upon where the program logic or intelligence therefore is located. It should be further appreciated that while a request may be made by the UIM 66, the controller 12IP may have received a message that the print job, i.e., determined at the User PC 14IP, is complete. Consequently, in this instance, the controller 12IP will not forward a command signal 62 to the language monitor 64 for issuance to the printer 44.

The page based-language monitor 64 (hereinafter the "language monitor" or "LM") receives print stream data from a page-based print processor 70 and is interposed between the system controller 12IP and the dedicated printer 44. In the broadest sense, the language monitor 64 is the gate-keeper of data communicated to the printer 44 from the controller 12IP. More specifically, the language monitor 64 retains material content data, including an object-data dictionary, for each page of material content and triggers the printer 44 to generate a particular page along with N number of additional pages. While this request to print is made by the controller 12IP, the language monitor 64 contains the active program code which intercepts the print stream data, i.e., the print control language (PCL) data, from the printer driver to throttle the rate that content material is generated.

More specifically, the page-based language monitor 64 is operative to vary the flow of print stream data to the printer 44 and vary the production rate of mailpiece content material. More specifically, the language monitor 64 includes a buffer file capable of storing 300 MB (300,000,000 bytes) of data. The buffer file is capable of storing multiple pages of data, including duplex pages. Hence, in the context used herein, a "page" of data includes all data which may be found on a two-sided sheet of paper.

The language monitor 64 is not tied to any print driver. As such, the language monitor 64 can operate without impacting the function of any print driver which may be employed. As will be appreciated in the subsequent section concerning page regeneration, the language monitor 64 also functions to move and/or erase data from the buffer to assist in regeneration. In the preferred embodiment, the page-based language monitor 64 communicates with the printer 44 across a USB line.

In operation, the application software 22IP produces an electronic version of the mailpiece content material 28IP and includes print program code for generating print stream data indicative of the mailpiece content material 22IP. In the context used herein, "print stream data" is any stream of data originated by the application software and sent to the integrated printer 44. Hence, print stream data includes data issued to the spooler, sent from the spooler to the print driver (sometimes referred to as spool data), transmitted from the print driver to the print processor (sometimes referred to as PCL data), or from the print processor to the integrated printer 44. Generally, the data is transmitted to a spooler 72 having a spool file (not shown in FIG. 3) which, in turn, is processed by a print driver (also not shown) to produce printer control language (PCL). The print stream data is then processed by the page-based print processor 70 (hereinafter the "print processor").

The principle function of the print processor 70 is to segment the print stream into data packets indicative of a self-contained page of mailpiece content material. In the context used herein, a "self-contained page of data" is a data set/packet of all data contained in a single page of content material including an object-data dictionary associated with the page of content material. Accordingly, the page has all of the necessary components/elements, including a dictionary of the page objects (e.g., font, size, spacing, margin information, formatting, etc.) required for printing. Furthermore, the print processor 70 parses the print stream so as to create a new print job for each page. In this way, the application software 22 and/or print spooler PS automatically attaches an object-data dictionary to each page of data. As an aside, each "self-contained page" is analogous to the "logical document" defined in the previous section entitled "System Architecture and Print Stream Modification".

The operation of parsing the print stream into stand alone pages is well-within the ability of a skilled artisan, though, it may be simply implemented by introducing a "StartDocPort" command to indicate that a new print job has started, a "WritePort" command to spool a new page, and an "EndDocPort" command to end the print job. A new buffer file is created in the language monitor 64 with each new page/print job created or each time the spooler 72 calls the "StartDocPort", "WritePort", and "EndDocPort" commands. To prevent the spooler 72 from closing the print job after the last page has been sent to the language monitor 70 a "Wait" command is introduced by the language monitor during the processing of the EndDocPort Command. As such, the page data will remain in the buffer file as the print stream/printed pages are throttled by the language monitor 64. As a result, the application software will complete processing. though the operating system will continue to waits for the EndDocPort command to complete processing. The buffers files containing the page files and object-data dictionary remains intact, i.e., for subsequent manipulation such as throttling and/or page regeneration. It also provides the ability to determine when the spool file is deleted based upon the external commands of the system controller.

Regeneration of Mailpiece Content Material

A limitation to data transmission speed along a USB cable relates to the total amount of data being sent in a print job. That is, a USB cable is generally limited to data transmission in data sets or packets of about 4 kB. Inasmuch as a self-contained page having an attached data dictionary a far greater amount of data, e.g., 15 KB wherein 5 kB may be associated with the data dictionary, the controller or processor must break the data into manageable packets or data sets, e.g., four data sets each containing 3.25 kB to transmit a single. It will therefore be appreciated that a transmission requiring hundreds, or perhaps thousands of pages, can significantly degrade transmission performance.

While the print processor 70 of the present invention breaks the print stream into self-contained pages, the method of the present invention sends the data dictionary once. That is, for each print job, the language monitor 64 transmits the page data for the entire job, but sends the data dictionary only once, i.e., with the first printed page of a job run. Comparing the amount of data associated with this method of data transmission to one which may require thousands of pages each having a dedicated data dictionary, the throughput along the USB cable can be increased by as much as twenty percent (20%).

Once the system controller 12IP communicates that a page has been successfully printed and/or processed, the language monitor 64 saves data associated with a self-contained page, one containing the page data and associated data dictionary, to a storage device such as a hard disk. Thereafter, when the controller communicates that printing has been unsuccessful or that a page, or several pages, has been damaged or otherwise mishandled (i.e., processed unsuccessfully), the language monitor 64 retrieves the self-contained pages, for the purpose of regeneration. While the transmission of these pages will each contain a data dictionary, it can be presumed that the number of pages to be printed, and the amount of additional data to be carried, is sufficiently small such that any degradation (i.e., speed reduction) in data transmission speed can be tolerated.

Figure 5:
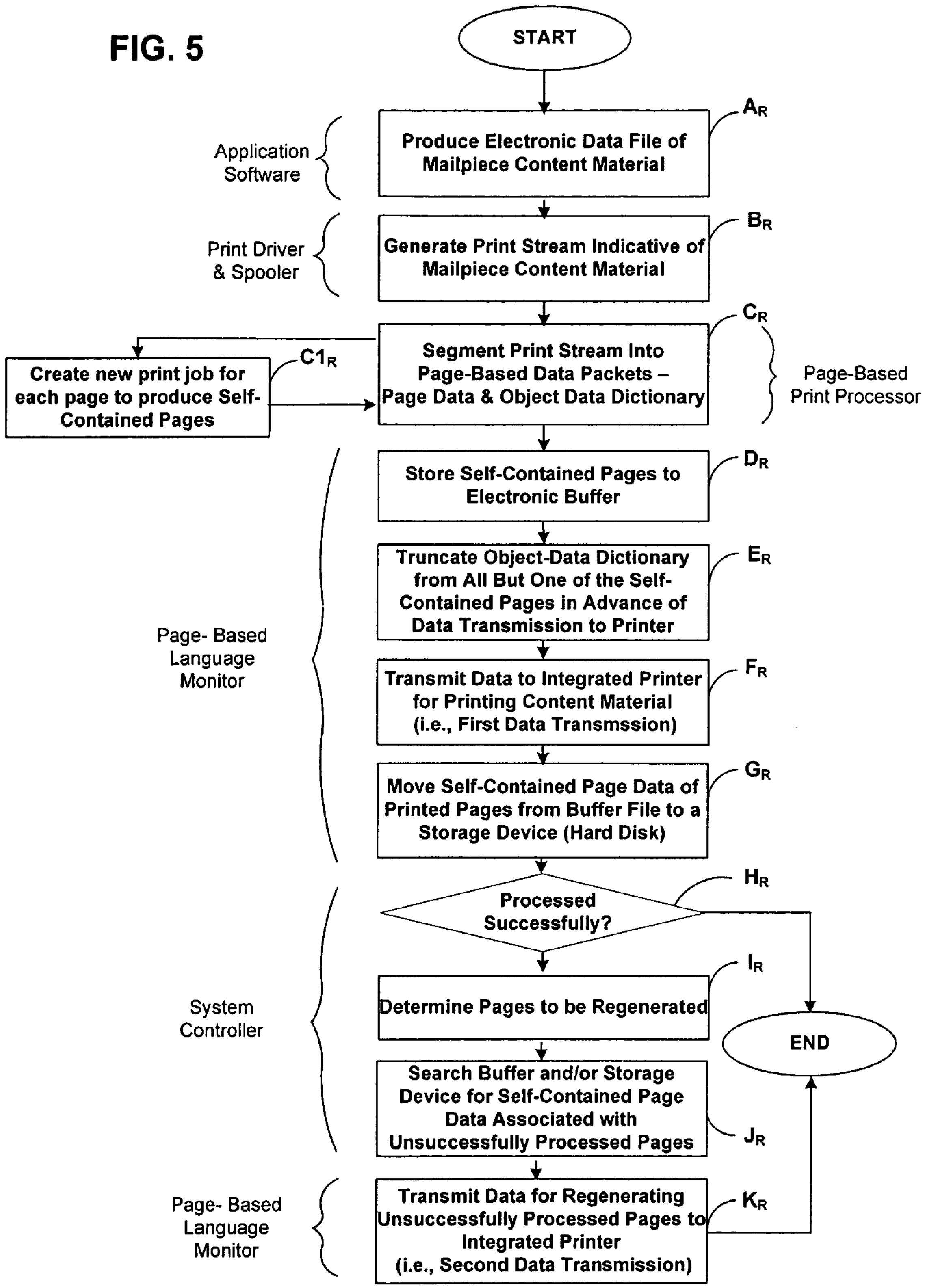
FIG. 5 depicts a flow diagram of the method steps for regeneration when pages are inadvertently misprinted, damaged or otherwise mishandled.

The method for regenerating pages is best understood by reference to FIG. 5 which depicts the various method steps associated with reprinting pages which have been unsuccessfully processed. In the context used herein the phrase "unsuccessfully processed" means that the page has not been printed properly, e.g., the printer is out of toner or ink, or has been damaged, jammed or otherwise mishandled. In step $A_R$, an electronic version of the mailpiece content material is produced by the application software 22. In the described embodiment, a Pitney Bowes mailpiece creation application software is employed known as PMR, though any application software may be used such as MS Word, MS Excel to produce the mailpiece content material. In step $B_R$, print stream data is generated by the application software which print stream data is indicative of the mailpiece content material. In step $C_R$, the page-based print processor 70 segments the print stream data into page-based data sets/packets. Each data set/packet contains the page-based data and object data dictionary associated with the page-based data. To facilitate the attachment of the object-data dictionary to the page-based data, in step $\mathbf{C1}_R$, a new print job is created for each page to produce self-contained pages.

In step $D_R$, the page-based language monitor 64 stores the newly created print jobs into an electronic buffer. As mentioned earlier, the size of the electronic buffer is about 300, 000,000 MB, though the buffer may be any size and depends upon the spooler page limit. In step $E_R$, the language monitor 64 truncates or deletes the object data dictionary from all but one print job or the first printed page. As such, data transmission across or through the USB cable to the printer is optimized, i.e., by minimizing the data being sent. After the data is prepared, in step $F_R$, the language monitor 64 sends the print stream/print page signal 74 to the printer for printing the content material during a first data transmission. Once the page has been successfully printed, in step $G_R$, the language monitor 64 moves the data from the buffer file to a storage device such as a hard disk. As such, this step eliminates the requirement to track when pages have or have not yet been printed. That is, it eliminates the requirement for tracking logic or other program code to perform this task. It also clears the buffer to accept more print stream data for subsequent processing.

In step $H_R$, the system controller 12IP determines whether the printed pages have been successfully processed. If the pages have been successfully processed, no further action is required, however, if certain pages have not been successfully processed system controller 12IP will determine which pages may have been effected, e.g., by a pager jam. The system controller 12IP will then, in step, $J_R$, search the buffer and/or storage device for the self-contained page data associated with the unsuccessfully processed pages. Assuming the operator has selected an "automatic page regeneration" option, (i.e., this option is typically made via the User Interface Module 66), a second data transmission is issued to the integrated printer, in step $K_R$, to regenerate the unsuccessfully processed pages.

During development, another design difficultly was uncovered relating to the manner in which software developers, such as the Microsoft Corporation, envision the way customers desire to print material. That is, most operating systems, such as the MS Windows OS, design application software to print material on a "document" basis. Furthermore, the documents envisioned are of a certain size, i.e., generally less than about 200 pages per document. Moreover, such developers assume that when a print request is made, the operator desires to print an entire document, rather than specific pages of the document (although some accommodation is made to print specific pages of a document).

On the other hand, customers in the mailstream industry, produce thousands of pages of mailpiece content material. Hence, a document for such operators includes an entire job run comprising each of these mailpiece pages. Furthermore, such operators may require that individual pages of a mailpiece be printed. Moreover, these operators may require that such pages be printed automatically when pages are misprinted, damaged or otherwise mishandled.

The MS Windows OS sends software application print stream data to a spooler having a spool file. Generally, this spool file is capable of rendering about 2 GB (2,000,000,000 bytes) of data which is the total available data space for a document, or when printing mailpieces, a print job. Generally, the entire document of the application software is processed, sent to the spool file, and then to the printer. Inasmuch as the data resides in the spool file, the application software can be used to produce yet other documents. Furthermore, the printer continues to print even after the application software has received a "print job completed" message.

While this method is adequate for printing conventional, relatively small documents, it is poorly-suited for mailpiece print jobs, i.e., jobs containing thousands of pages wherein individual pages thereof may require regeneration. For example, if an operator wishes to reprint an individual page using conventional operating system architecture, the operator must either reprint the entire document or send additional data to the spool file associated with the individual pages to be regenerated. This is required inasmuch as once the program code message "print job completed", or "EndDocPort", is received, the page data and data dictionary associated with that page is erased. It should be appreciated that the data dictionary for page is generally located at the beginning or header of a document and is associated with the "entire" document, rather than "individual pages" of the document. Hence, even if the data associated with an individual page were retrievable, the data dictionary would generally be lost (i.e., being located at the beginning of the data stream).

Accordingly, the inventors of the present invention introduced or, more accurately, substituted, the aforementioned page-based language monitor 64 and page-based print processor 70 for a conventional language monitor and print processor to enable page-based printing for both throttling and page regeneration. That is, without a page-based print processor and language monitor 64, it would not be possible to request that individual pages (e.g., pages five through nine) be throttled for printing to match the inserter throughput rate. Furthermore, without the same elements, it would not be feasible to automatically or immediately regenerate individual pages, as may be required when pages are damaged.

In summary, the inventive system and method intercepts and throttles the print stream to optimize the throughput of a mailpiece creation system. Furthermore, the invention facilitates the creation, modification and printing of mailpieces produced by a mailpiece inserter. Print stream throttling is enabled by a page-based language monitor 64 and page-based print processor 70 to facilitate the storage and printing of individual pages irrespective the initial print stream data produced by the application software. Furthermore, the self-contained pages can be printed "on the fly" without the requirement for multiple manual operations such as selecting the reprint items/pages, printing on and external printer and rerunning the print job. It will therefore be appreciated that the throughput of mailpiece content material is substantially enhanced by the system and method of the present invention.

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

The invention claimed is:

1. A method for printing and regenerating mailpiece content material in a mailpiece creation system having a controller for modulating the flow of data to a integrated printing device, the method comprising the steps of:

producing an electronic version of the mailpiece content material generating print stream data indicative of the mailpiece content material;

segmenting the print stream into data packets indicative of a self-contained page of mailpiece content material, the data packets including page-based data and an object-data dictionary associated with each of the page-based data, storing the data packets as electronic files in an electronic buffer;

transmitting the electronic files to the integrated printer for printing the mailpiece content material during a first data transmission;

moving the electronic files of self-contained pages from the electronic buffer to a storage device following the first data transmission, and transmitting electronic files to the integrated printer from the storage device to regenerate mailpiece content material during a second data transmission in response to a message from the controller that the page has been processed unsuccessfully.

2. The method according to claim 1 further comprising the steps of;

transmitting all page based data and a single data dictionary to the integrated printer during the first data transmission to the integrated printer, and transmitting all self-contained pages, including the page based data and object data dictionaries during the second data transmission associated with regenerating a page of content material.

3. The method according to claim 1 further comprising the steps of:

deleting the electronic files of the buffer following the first data transmission in response to a message from the controller that the data therefrom has been processed unsuccessfully;

transmitting all self-contained pages, including the page based data and object data dictionaries, from the stored electronic files during a second data transmission associated with regenerating a page of content material.

4. The method according to claim 1 wherein the step of segmenting the print stream includes the step of creating a new print job for each page of content material so as to produce self-contained pages each including an object data dictionary of the page based data.

5. The method according to claim 1 further comprising the step of truncating the object-data dictionary from all but one of the self-contained pages during the first data transmission to increase transmission speed through data lines having data capacity limitations.

6. The method according to claim 1 further comprising the step of determining whether the electronic file has been moved from the buffer to the storage device to expedite processing of the regenerated page data.

7. The method according to claim 1 further comprising the step of automatically regenerating a page during the second transmission of data when a message is received from the controller that the page has been processed unsuccessfully.

* * * * *